F. J. LAPOINTE.
KEY SEAT BROACHING MACHINE.
APPLICATION FILED AUG. 23, 1913.
1,109,847.
Patented Sept. 8, 1914.
6 SHEETS—SHEET 1.
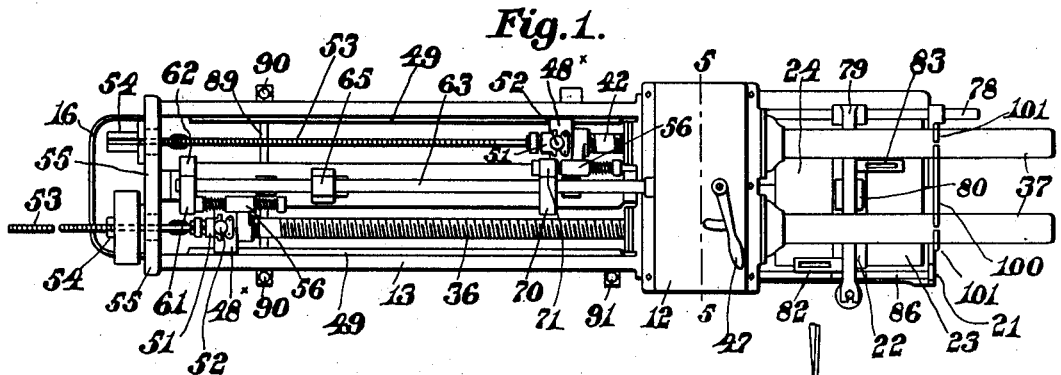
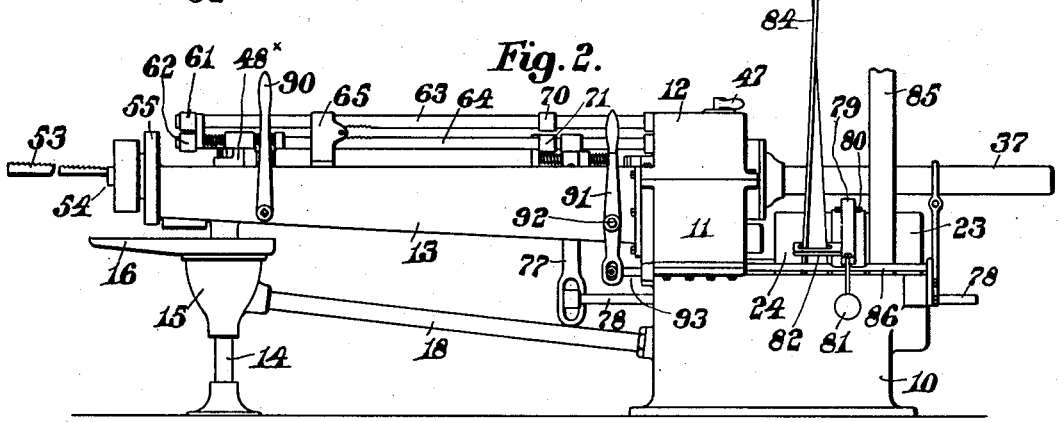
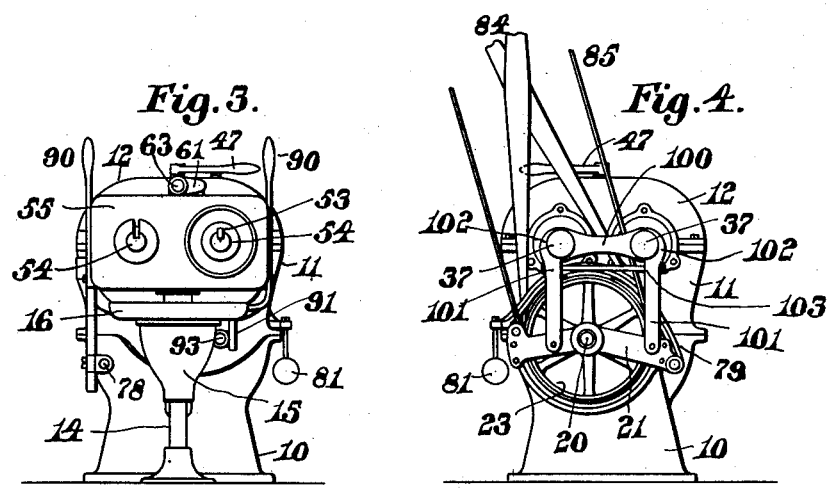
Witnesses:
N. C. Lombard
M. C. Smith.
Inventor:
Francis J. Lapointe,
by Walter E. Lombard,
Atty.

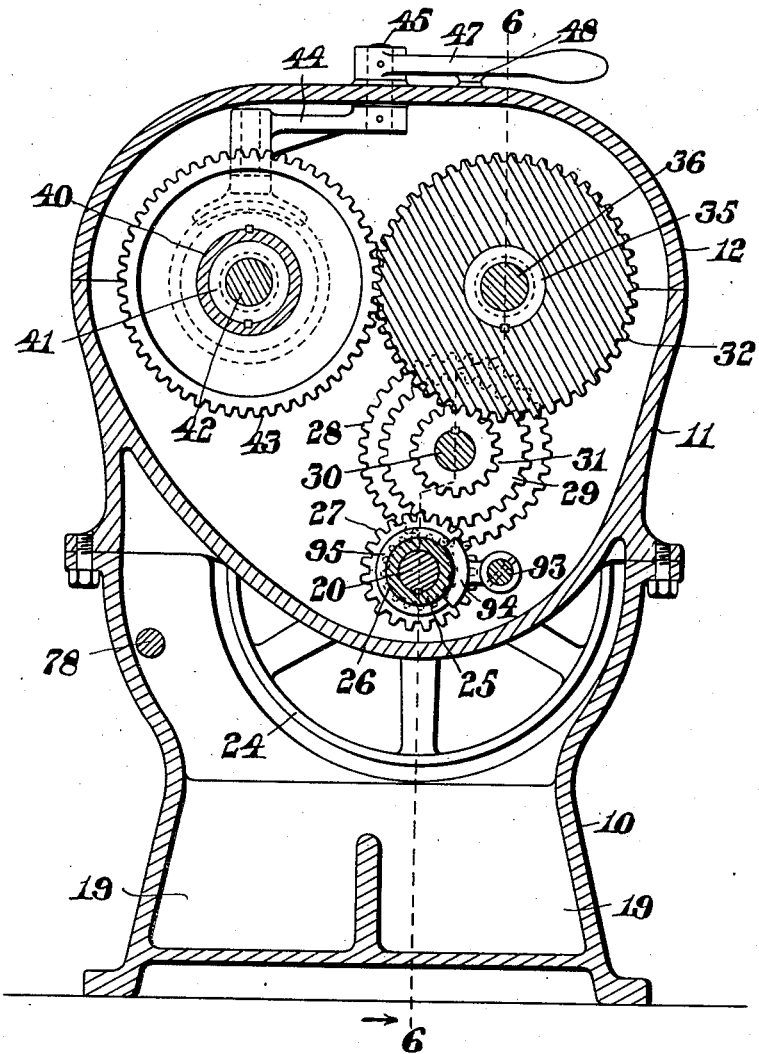

F. J. LAPOINTE.
KEY SEAT BROACHING MACHINE.
APPLICATION FILED AUG. 23, 1913.

1,109,847.

Patented Sept. 8, 1914.
6 SHEETS—SHEET 3.

Witnesses:
N. C. Lombard
M. C. Smith.

Inventor:
Francis J. Lapointe,
by Walter E. Lombard
Atty.

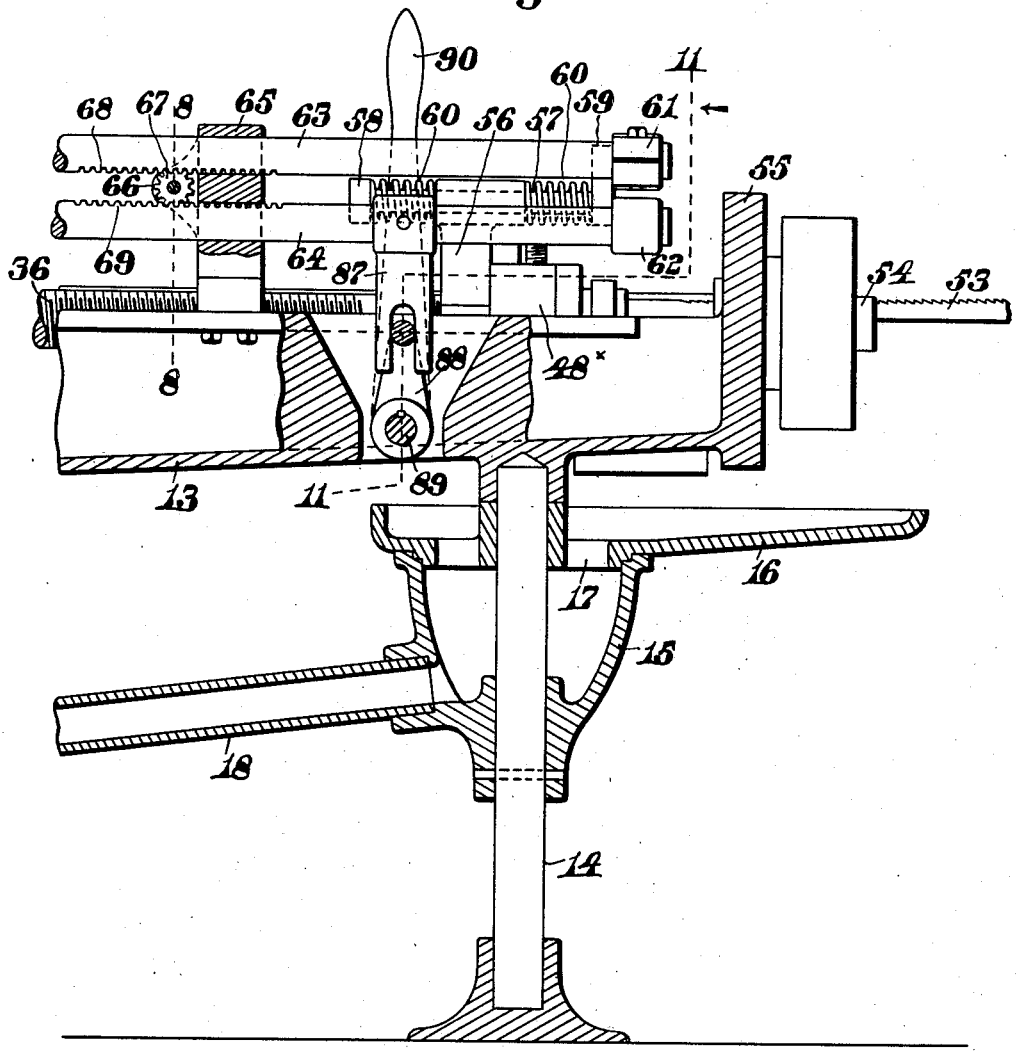
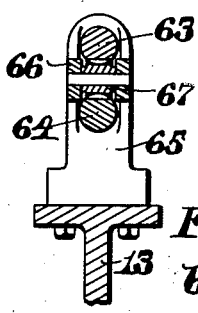

F. J. LAPOINTE.
KEY SEAT BROACHING MACHINE.
APPLICATION FILED AUG. 23, 1913.

1,109,847.

Patented Sept. 8, 1914.
6 SHEETS—SHEET 5.

Witnesses:
N. C. Lombard
N. C. Smith

Inventor:
Francis J. Lapointe,
by Walter E. Lombard
Atty.

F. J. LAPOINTE.
KEY SEAT BROACHING MACHINE.
APPLICATION FILED AUG. 23, 1913.

1,109,847.

Patented Sept. 8, 1914.

6 SHEETS—SHEET 6.

Witnesses:
N. C. Lombard
M. C. Smith

Inventor:
Francis J. Lapointe,
by Walter E. Lombard.
Atty.

UNITED STATES PATENT OFFICE.

FRANCIS J. LAPOINTE, OF NEW LONDON, CONNECTICUT.

KEY-SEAT-BROACHING MACHINE.

1,109,847.  Specification of Letters Patent.  Patented Sept. 8, 1914.

Application filed August 23, 1913. Serial No. 786,321.

*To all whom it may concern:*

Be it known that I, FRANCIS J. LAPOINTE, a citizen of the United States of America, and a resident of New London, in the county of New London and State of Connecticut, have invented certain new and useful Improvements in Key-Seat-Broaching Machines, of which the following is a specification.

This invention relates to key-seat broaching machines, and has for its object the production of machines of this class that will be capable of accomplishing a greater amount of work than is now produced by the machines of this class heretofore in use.

The invention consists primarily in providing the machine with two tool carrying heads operated by mechanism so that one is always returning to its normal position preparatory to operating upon a piece of work while the other tool is in operation upon another piece of work.

The invention further consists in certain novel features of construction and arrangement of parts which will be fully understood by reference to the description of the drawings and to the claims hereinafter given.

Figure 6:
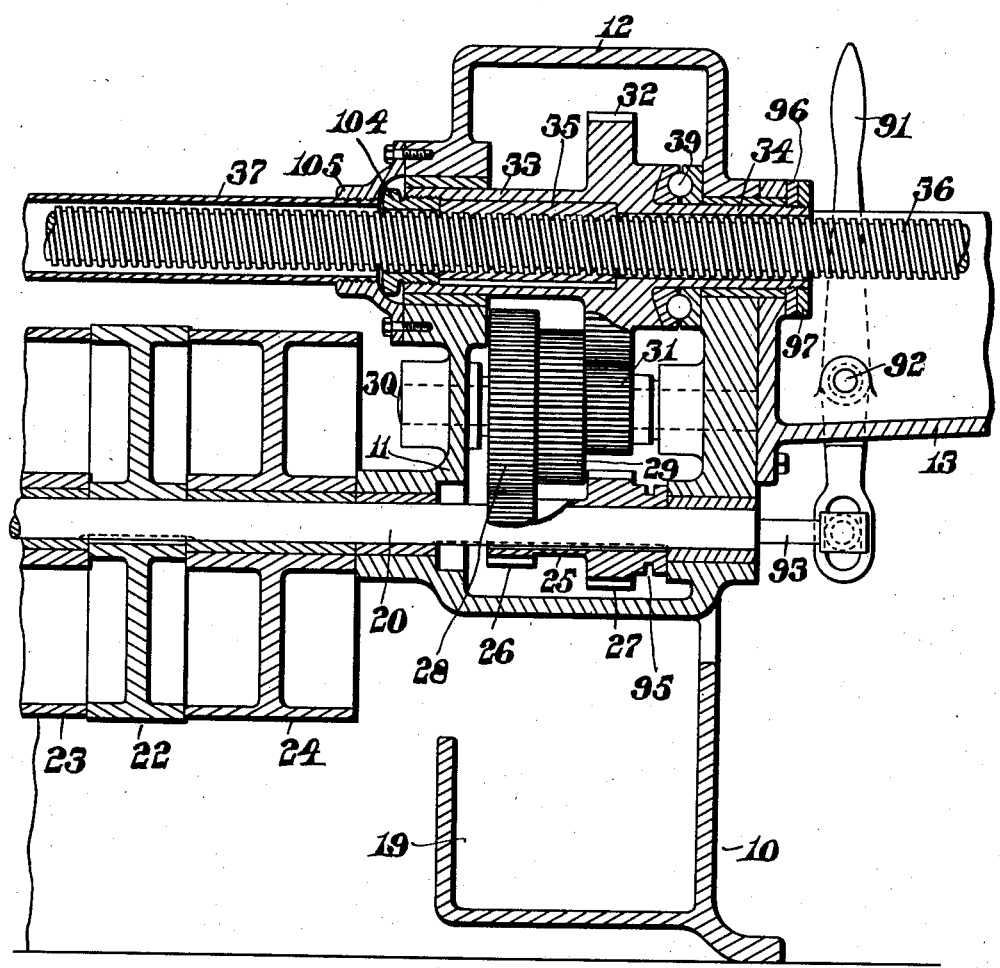
Figure 9:
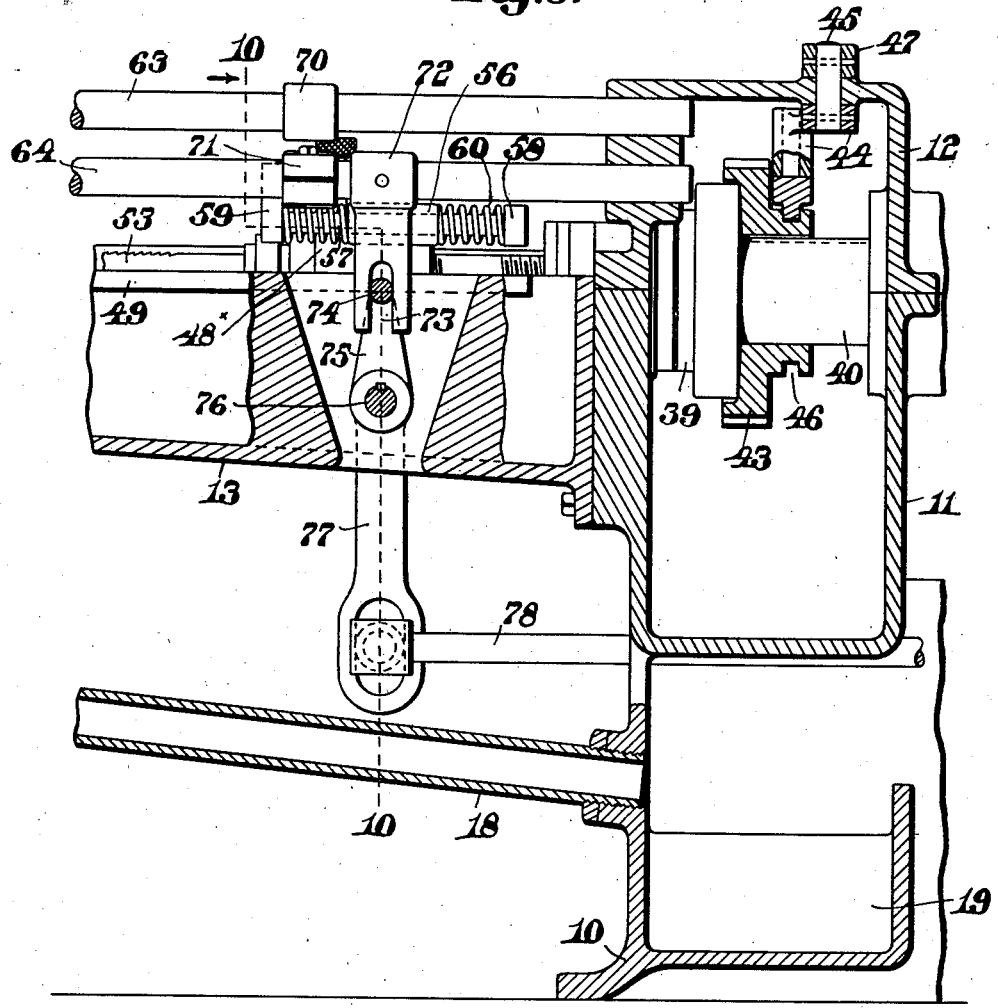
Figure 10:
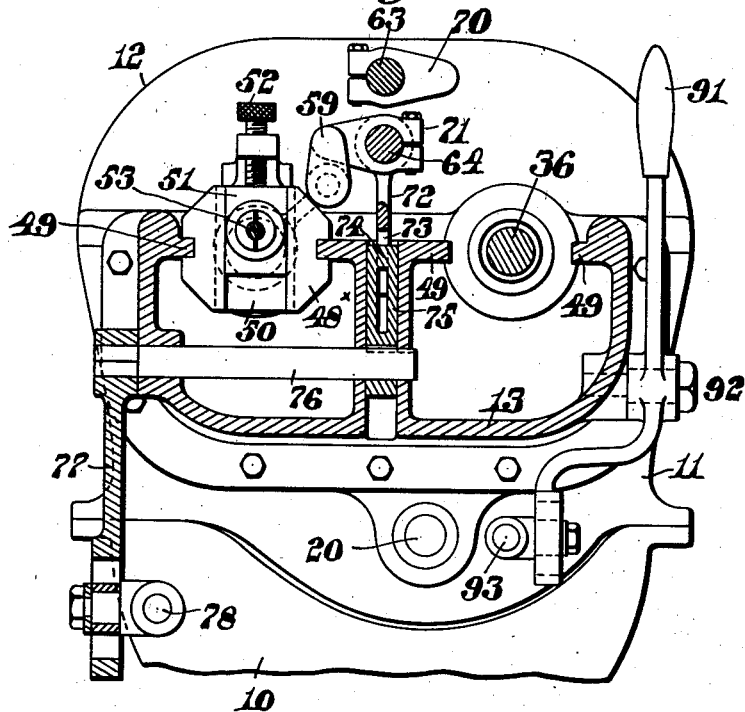
Figure 11:
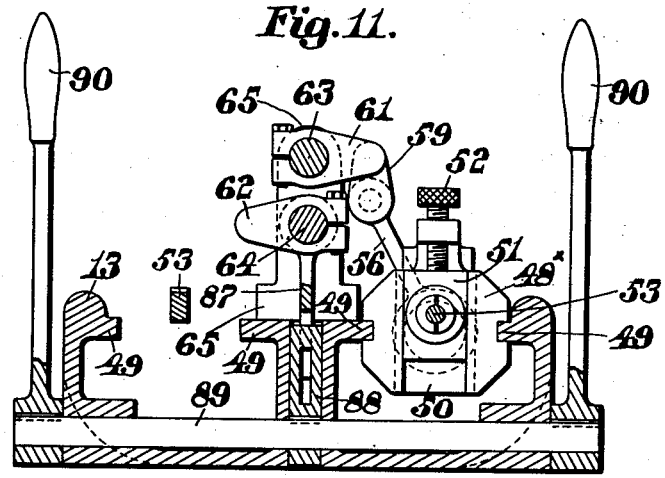

Of the drawings: Figure 1 represents a plan of a machine embodying the features of the present invention. Fig. 2 represents a front elevation of the same. Fig. 3 represents a left end elevation of the same. Fig. 4 represents a right end elevation of the same. Fig. 5 represents a vertical transverse section of the same, the cutting plane being on line 5—5 on Fig. 1. Fig. 6 represents a vertical longitudinal section of a portion of the machine including the screw operating mechanisms, the cutting plane being on line 6—6 on Fig. 5. Fig. 7 represents a central longitudinal section of the left end of the machine. Fig. 8 represents a sectional detail, the cutting plane being on line 8—8 on Fig. 7. Fig. 9 represents a central longitudinal section of the right end of the machine. Fig. 10 represents a transverse vertical section of the same, the cutting plane being on line 10—10 on Fig. 9, and Fig. 11 represents a transverse vertical section of the left end of the machine, the cutting plane being on line 11—11 on Fig. 7.

Similar characters designate like parts throughout the several figures of the drawings.

In the drawings, the base 10 has secured thereto the gear casing 11 provided with a cover 12. To the front end of the gear casings 11—12 is secured the bed 13 which is supported at its outer end by the standard 14. Surrounding the standard 14 and secured thereto is an oil receptacle having secured to its upper edge an inclined shelf 16 extending beyond the outer end of the bed 13 beneath the work being operated upon, said shelf being adapted to catch the oil and other drippings when the work is being operated upon. The shelf 16 has passages 17 therethrough communicating with the receptacle 15. An inclined pipe 18 extends from the bottom of the receptacle 15 into a compartment 19 in the base 10 adapted to receive through said pipe 18 the oil and other fluid collected by the shelf 16. In bearings in the gear casing 11 is mounted the revoluble shaft 20 the outer end of which is supported by the end plate 21 secured to outwardly extending bosses on the base 10.

Keyed to the shaft 20 is the pulley 22 on opposite sides of which are the pulleys 23—24 freely revoluble about said shaft. Keyed to and slidable longitudinally of said shaft 20 is a sleeve 25 having formed thereon the pinions 26 and 27 of different diameters. The smaller pinion 26 normally meshes with the gear 28 but may be moved out of mesh therewith to permit the larger pinion 27 to mesh with the smaller gear 29. The gears 28—29 of different diameters are keyed to and revolve with the shaft 30 which also has keyed thereto the pinion 31 meshing with the gear 32.

The gear 32 is provided with tubular hubs 33—34 revoluble in bearings in the gear casing 11—12. This gear 32 serves as a carrier for the nut 35 keyed therein and in which is mounted the screw 36, the rear end of which is inclosed within a housing 37. Between the gear 32 and the front face of the gear casings 11—12 are interposed the anti-friction devices 39 adapted to care for any end thrust during the operation of the cutting tool. The gear casing 11—12 has also revolubly mounted therein a tubular member 40 serving as a carrier for the nut 41 keyed therein and in which is mounted the screw 42 similar to the screw 36. The outer end of this screw 42 is also inclosed in a housing 37 and the end thrust is cared for by an anti-friction device 39 similar to that on the screw 36 and shown in Fig. 6. The tubular member or carrier 40 has keyed thereto and slidably mounted thereon a gear 43 adapted to mesh with the gear 32, a lever 44 secured to the pin 45 engaging an annular groove 46 in the hub of said gear 43 and providing a means whereby said gear 43 may be thrown in and out of mesh with said gear 32. The pin 45 has secured thereto the operating handle 47 provided with a locking projection 48 of usual construction by which said lever 44 may be retained in adjusted position.

It is obvious that by means of the handle 47 the gear 43 may be thrown into mesh with the gear 32 to cause both screws 36 and 42 to be reciprocated in the nuts 35 and 41 or the gear 43 may be thrown out of mesh with the gear 32 thereby permitting the screw 36 to be reciprocated while the screw 42 remains at rest. The outer end of each screw 36—42 has secured thereto a head 48× adapted to slide on the ways 49 forming a part of the bed 13. Each head 48× is provided with a vertical groove 50 therein in which is mounted a block 51 adapted to be raised and lowered by the adjusting member 52. Each block 51 has secured thereto a cutter bar 53 extending through and guided by a slot in the work support 54 mounted in the end plate 55 of the bed 13. The rear of each head 48× is provided with an arm 56 having mounted in its outer end the stop member 57 provided at its ends with heads 58—59 between each of which and the said arm 56 is interposed a yielding spring 60. The heads 59 extend upwardly in the path of an arm 61 or 62 secured respectively to the reciprocating rods 63—64. These rods 63—64 are mounted at one end in bearings in the bracket 65 secured to the bed 13 at a point midway between the screws 36 and 42 and at the other end in bearings formed in the gear casing cover 12. The bracket 65 is provided with ears 66 in which is secured a pin on which is revolubly mounted a pinion 67 between said ears, the teeth of said pinion meshing with rack teeth 68 and 69 formed respectively in the rods 63—64. It is obvious that by this device any movement of a rod 63 or 64 in one direction will impart movement to the other rod in the opposite direction. In addition to the arms 61 and 62 the rods 63 and 64 are provided respectively with the stop members 70—71 in the path of the heads 59, which in the reciprocation of the screws 36—42 are adapted to come in contact with either of the stop members 61 or 70 and 62 or 71 and move the rods 63, 64 sufficiently to stop the machine.

The rod 64 has secured thereto a forked member 72 with the slot 73 of which the pin 74 engages. This pin is formed in the end of the lever 75 secured to the rocker shaft 76 adapted to oscillate in bearings in the bed 13, the outer end of said shaft having secured thereto the lever 77 to which is pivotally connected the belt shifting rod 78. The rod 78 has secured thereto the curved arm 79 normally extending over the fixed pulley 22 and carrying a friction pad 80 adapted to engage said pulley, a weight 81 at the outer end of said arm being provided to normally retain said pad 80 in contact with said pulley.

The arm 79 has secured thereto the slotted members 82—83 encircling the driving belts 84 and 85 respectively. The arm 79 rests upon a cam rod 86 having a depression therein which permits the engagement of the pad 80 with the fixed pulley 22 when the arm 79 is over said pulley. As soon, however, as the arm 79 is moved in either direction to shift either of the belts 84—85 onto the fixed pulley, said pad 80 will be lifted from contact with said pulley 22 by the cam surfaces on said rod. The rod 64 has also secured to its opposite end a forked member 87 the slot of which is engaged by the lever 88 secured to a rocker shaft 89 adapted to oscillate in bearings in the bed 13. The outer ends of the rocker shaft 89 have secured thereto the operating handles 90 by which the rod 64 may be moved to shift either of the belts 84—85 onto the fixed pulley 22 to move the screw 36 in either direction. The same movement of the rod 64 moves its stop members 62 and 71 into position to be acted upon by the head 59 to again shift the belts 84—85 at the end of a predetermined movement, thus stopping the machine. Through the medium of the pinion 67 this movement of the rod 64 in one direction causes the rod 63 with its stop members 61—70 to be moved an equal distance in the opposite direction, so that if both screws 36—42 are reciprocating the movement of the screw 42 will be arrested while moving in one direction at the same time the movement of the screw 36 in the opposite direction is arrested.

An operating lever 91 is pivoted at 92 to the bed 13, the opposite end of said lever being pivotally connected to the rod 93, the opposite end of which has secured thereto a shoe 94 fitted to the annular groove 95 in the sleeve 25. By means of this device the sleeve 25 may be shifted at will so that either the small pinion 26 may be brought into mesh with the large gear 28 or the larger pinion 27 brought into mesh with the smaller gear 29, thus providing means for securing two speeds at which the screws 36—42 may be reciprocated. The outer end of the tubular hub 34 is threaded and provided with a lock washer 96 and check nut 97 by which the anti-friction device 39 may be kept properly adjusted at all times. The washer 96 and check nut 97 also serve to sustain the end thrust of the screw 36 when the nut 35 is rotated in a reverse direction.

By the operation of the lever 47 the gear 43 may be moved out of mesh with the gear 32 when the parts are in the position shown in Fig. 1 and the machine may then be operated as a single broaching machine using the screw 36 only, the screw 42 remaining in the position indicated in said figure.

By disengaging the gear 43 when the head 48ˣ of the screw 42 is at its starting position, moving the head 48ˣ of the screw 36 a predetermined distance, and then again meshing the gears 43—32 any predetermined stroke desired for said screws may be quickly obtained by the adjustment of one or more of the stop members on the rods 63—64. It is obvious that by this means any stroke may be set for the operating head and both heads will operate under the same length of stroke.

Between the housings 37 is a separating member 100 and pivoted to the end plate 21 are two arms 101 each having at its outer end a curved portion 102 fitted to a portion of the outer wall of a housing 37. The two arms 101 are held in contact with the housings 37 and are prevented from separating by means of the tie rod 103. By this construction the outer ends of the housings 37 are given a support which retains them in axial alinement with the screws 36—42 movable therein. It is obvious that when it is desired to remove the housings 37 the supporting and positioning members 100—101—101 may be quickly disengaged from said housings to permit such removal.

The belt 84 is adapted to drive the pulley 22 in one direction while when this belt 84 is removed from said pulley and the belt 85 is shifted thereon a movement of the pulley 22 in the opposite direction is assured, thus reversing the operation of the machine. As the means for shifting the belts 84—85 is similar in construction and operation to the devices shown in another application of mine filed June 10, 1912, and numbered 703,094, it is believed that a detailed description thereof is unnecessary. The nut 35 is held in position within the tubular hub 33 of the gear 32 by means of the check nut 104 threaded to said hub 33, said nut 35 being adapted to be removed from said hub 33 whenever the check nut 104 has been removed from said hub. The head of the nut 104 revolves in a chamber in the flanged support 105 of the housing 37, said support being bolted to the right hand face of the gear casing 11—12 and preventing the accidental displacement of said nut 104. The springs 60 on the headed member 57 have the same tension and are adapted to keep the heads 58 and 59 equidistant from the ends of the tubular end of the arm 56 and in balanced position at all times.

When it is desired to operate upon a gear or other article to cut a key-seat therein, the article is placed upon one of the work supports 54 and the working tool 53 extends through the radial slot in said work support as is usual in other classes of broaching machines. The operator then moves the handle 90 at the front of the machine to the left, thereby moving the rod 64 in the same direction and the rod 63 in the opposite direction. This movement of the rod 64 to the left will move the rod 78 in the opposite direction, this movement being effected through the medium of the forked arm 72, lever 75, rocker shaft 76 and lever 77. This movement of the rod 78 will cause the brake arm 79 to be lifted as it rides along the cam rod 86 from the depression therein onto the full diameter thereof. The raising of the brake arm will remove the pad 80 from contact with the periphery of the fixed pulley 22. While this movement is occurring the belt 84 is simultaneously shifted from the loose pulley 24 onto the fixed pulley 22 and the shaft 20 is then rotated in a direction to cause, through the driving mechanism, such a rotation of the nut 35 as will move the screw 36 to the right of Fig. 2 of the drawings, thereby effecting an operation of the working tool. If the gears 32—43 are in mesh the nut 41 will be rotated in a direction to move the screw 42 in the opposite direction. As the screws 36—42 approach the end of their stroke in opposite directions the head 59 on the former engages the stop 70 on the rod 63 and the head 59 on the latter simultaneously engages the stop 62 on the rod 64, the various members being returned to their normal positions and the machine is stopped. The screw 42 is now in position to commence a cutting operation while the work of the screw 36 has been completed. The article being operated upon is removed from the front work support 54 and an article such as a gear is placed upon the rear work support and the front lever 90 is moved to the right, thus shifting the belt 85 from the loose pulley 23 to the fixed pulley 22 and causing the nuts 35 and 41 to be rotated in the opposite direction, thereby effecting a reverse end movement of both of the screws 36 and 42. The length of stroke of the screws 36—42 may be regulated by adjusting the stop members 61—62, 70 and 71 on the rods 63—64 and clamping them in their adjusted positions, it being understood that this adjustment is made when the gear 43 is out of mesh with the gear 32 and the head 48ˣ of the screw 42 is in starting position adjacent to the end plate 55.

It is believed that the operation and many advantages of the invention will be fully understood from the foregoing description.

Having thus described my invention, I claim:

1. In a machine of the class described, the combination of two reciprocating tool holders, each consisting in part of a nonrevoluble screw; a working tool for each holder; means coacting with said screws for reciprocating said tool holders simultaneously in opposite directions; and means for arresting the movement of said holders at the end of a predetermined stroke.

2. In a machine of the class described, the combination of two reciprocating tool holders each consisting in part of a nonrevoluble screw; a working tool for each holder; a nut on each screw; a gear for driving each nut, said gears meshing and rotating said nuts in opposite directions; mechanism for driving one of said gears; and means for arresting the movement of said driving mechanism at the end of a predetermined stroke of said tool holders in either direction.

3. In a machine of the class described, the combination of two reciprocating tool holders each consisting in part of a nonrevoluble screw; a working tool for each holder; a nut on each screw; a gear for driving each nut, said gears meshing and rotating said nuts in opposite directions; mechanism for driving one of said gears; a pivotal lever for moving the other gear out of mesh with the driven nut gear; and means for arresting the movement of said driving mechanism at the end of a predetermined stroke of said tool holders in either direction.

4. In a machine of the class described, the combination of two reciprocating tool holders each consisting in part of a nonrevoluble screw; a working tool for each holder; a nut on each screw; a carrier for each nut; a gear fixed on one carrier; a companion gear adapted to mesh therewith movable lengthwise of the other carrier; means for moving the latter gear into and out of mesh with the fixed gear; mechanism for driving said fixed gear in either direction; and means for arresting the movement of said driving mechanism at the end of a predetermined stroke of said tool holder in either direction.

5. In a machine of the class described, the combination of a working tool; a reciprocating tool holder consisting in part of a nonrevoluble screw; a nut thereon; a gear to drive said nut provided with tubular hubs revoluble in bearings, one of said hubs containing said nut; an anti-friction device for surrounding the other hub between said gear and the bearing for said hub; and members threaded to the outer end of said hub adapted to adjust said antifriction device and sustain the end thrust when said nut is rotated in a reverse direction.

6. In a machine of the class described, the combination of two reciprocating tool holders; a working tool for each holder; means coacting with said tool holders for simultaneously reciprocating them in opposite directions; and means for predetermining the length of stroke of said holders and arresting the movement thereof at the end of said predetermined stroke.

7. In a machine of the class described, the combination of two reciprocating tool holders; a working tool for each holder; means coacting with said tool holders for simultaneously reciprocating them in opposite directions; means for arresting the movement of said holders at the end of a predetermined stroke; and means for throwing one of said holders out of commission temporarily, moving the other holder a predetermined distance, and then again placing said first mentioned holder in commission.

8. In a machine of the class described, the combination of a single driving mechanism adapted to be operated alternately in opposite directions; two reciprocating tool holders each consisting in part of a nonrevoluble screw; a nut for each screw being adapted to be simultaneously rotated in opposite directions by said driving mechanism; and a working tool for each holder.

9. In a machine of the class described, the combination of two reciprocating tool holders; a working tool for each holder; mechanism for reciprocating said tool holders simultaneously in opposite directions; two reciprocating rods interposed between said holders and parallel to the path of movement thereof; means interposed between said rods insuring their simultaneous movement in opposite directions; stop members on said rods; means connected with said rods for starting and stopping said reciprocating mechanism; means for moving said rods to operate the holder reciprocating mechanism; and a member on each holder adapted to engage a stop member on said rods at each end of its reciprocating movement to stop the operation of said holder reciprocating mechanism.

10. In a machine of the class described, the combination of two reciprocating tool holders; a working tool for each holder; mechanism for reciprocating said tool holders simultaneously in opposite directions; two reciprocating rods interposed between said holders and parallel to the path of movement thereof, each rod being provided with rack teeth; a pinion interposed between said rods and meshing with said rack teeth insuring their simultaneous movement in opposite directions; stop members on said rods; means connected with said rods for starting and stopping said reciprocating mechanism; means for moving said rods to operate the holder reciprocating mechanism; and a member on each holder adapted to engage a stop member on said rods at each end of its reciprocating movement to stop the operation of said holder reciprocating mechanism.

11. In a machine of the class described, the combination of two reciprocating tool holders; a working tool for each holder; mechanism for reciprocating said tool holders simultaneously in opposite directions controlled by a slidable belt shifting rod; two reciprocating rods interposed between said holders and parallel with the path of movement thereof; means insuring the simultaneous end movement of said rods in opposite directions; stop members on opposite ends of said rods; a lever for moving said belt shifting rod; means secured to one of said reciprocating rods for operating said lever; means for moving said rods from their normal position; and a member on each holder adapted to engage a stop member on said rods at each end of its reciprocating movement to return said reciprocating rods to their normal position.

12. In a machine of the class described, the combination of two reciprocating tool holders; a working tool for each holder; mechanism for reciprocating said tool holders simultaneously in opposite directions controlled by a slidable belt shifting rod; two reciprocating rods interposed between said holders and parallel with the path of movement thereof; means insuring the simultaneous end movement of said rods in opposite directions; stop members on opposite ends of said rods; a lever for moving said belt shifting rod; means secured to one of said reciprocating rods for operating said lever; a rocker shaft; a lever for operating said shaft; a forked member on one of said reciprocating rods; a lever on said rock shaft engaging said forked member; and a member on each holder adapted to engage a stop member on said rods at each end of its reciprocating movement to return said reciprocating rods to their normal positions.

13. In a machine of the class described, the combination of two reciprocating tool holders each consisting in part of a nonrevoluble screw; a working tool for each holder; a housing for the projecting end of each screw; a rotatable nut for reciprocating each screw; driving mechanism for said nuts; a casing for said nuts and driving mechanism; a separator plate between said housings; pivoted arms the ends of which are fitted over a portion of the peripheries of said housings; and a connecting rod between said arms.

Signed by me at Boston, Mass., this 19th day of August, 1913.

FRANCIS J. LAPOINTE.

Witnesses:
WALTER E. LOMBARD,
NATHAN C. LOMBARD.